United States Patent Office.

FRANKLIN A. CURTIS, OF EAST SAGINAW, MICHIGAN.

Letters Patent No. 79,782, dated July 7, 1868.

IMPROVED WATER AND FIRE-PROOF ROOFING-COMPOUND.

*The Schedule referred to in these Letters Patent and making part of the same.*

TO ALL WHOM IT MAY CONCERN:

Be it known that I, FRANKLIN A. CURTIS, of East Saginaw, in the county of Saginaw, and State of Michigan, have invented a new and useful Improvement in Elastic Fire and Water-Proof Roofing; and I do hereby declare the following to be a true and accurate description thereof, sufficient to enable others skilled in the art to make and use this improved roofing.

The nature of this invention is to manufacture an elastic fire and water-proof compound for roofing, which may be used with or without felting or paper, and which will be what it purports, i. e., perfectly water and fire-proof, and will not be affected by the variations of temperature in any climate.

In order to accomplish this end, I take thirty (30) pounds of coal-tar, ten (10) pounds of wheat or rye flour, and one hundred (100) pounds of water-lime, and mix, thoroughly cold, so as to make a thick mortar, adding, if required, a little more of the ingredients proportionately, to bring the mixture to the proper consistence. Then the mortar should be spread evenly upon the roof, and one hundred (100) pounds of common sand be sifted upon it.

In manufacturing a compound for roofing purposes, I am able to do away with the necessity of heating the coal-tar, as is ordinarily done, thereby saving very materially in time, labor, and cost.

Having thus described my invention, what I claim as new, and desire to secure by Letters Patent, is—

The roofing-compound, when composed of coal-tar, wheat or rye flour, water-lime, and sand, mixed in a cold state, as herein described.

FRANKLIN A. CURTIS.

Witnesses:
WM. J. LOVELAND,
B. M. THOMPSON.